United States Patent [19]
Dettmer

[11] 3,805,888
[45] Apr. 23, 1974

[54] ROTARY JOINT

[75] Inventor: Edward V. Dettmer, Bay City, Mich.

[73] Assignee: The Dow Chemical Company, Midland, Mich.

[22] Filed: Feb. 17, 1972

[21] Appl. No.: 227,197

[52] U.S. Cl. .............................................. 165/86
[51] Int. Cl. ........................................... F28d 11/00
[58] Field of Search ............. 165/47, 86, 87, 89, 90

[56] References Cited
UNITED STATES PATENTS
3,411,568   11/1968   Corang ................................ 165/86
3,621,908   11/1971   Pravda ................................ 165/86

Primary Examiner—Charles Sukalo

[57] ABSTRACT

An improved rotary joint comprises an assembly wherein all of the fluid-passing and heat-exchange communicating tubes, which are concentrically assembled and circumferentially rotatable as a unit, rotate as a single unit in and with the roll or screw being heated and/or cooled and the tubes terminate at their feed inlet and vent exhaust ends within a fixed housing. Reduced wear is noted for this variety of joint which is advantageously employed for the feeding of various heat-exchange liquids or other fluids to miltizone extruder screws or the like, and for analogous applications.

10 Claims, 9 Drawing Figures

ROTARY JOINT

BACKGROUND OF THE INVENTION

The present invention pertains to an improved rotary joint suitable for the feeding of heat exchange liquids and/or other fluids and vapors to such a unit as a multi-zone extruder screw or the like apparatus requiring to have heating and/or cooling effects in association therewith; or for and in equivalent and analogous purposes and installations.

Rotary joints and like arrangements for transfer and other handling usage of heat exchange liquids and fluids have been widely employed and are well known in the art. For example, a multi-zone extruder screw is illustrated in U. S. Pat. No. 3,331,100. Other references disclosing similar or analogous apparatus arrangements include: U. S. Pat. Nos. 464,706; 531,615; 1,523,822; 1,788,500; 2,187,147; 2,462,006; 2,343,491; 2,599,664; 2,693,373; 2,877,026; 2,805,087; and 3,061,337.

A significant and more-or-less common serious deficiency in the heretofore known devices of the indicated sort, however, is that the means or conduit provision for transferring and moving each particular heat-exchanging liquid or fluid is independently arranged and rotated through separate joints. Thus, a great deal of complication in the necessary mechanical assembly involved must be experienced. As a consequence of this, much more than is desirable wear of and on and inefficiency in and with the apparatus is experienced. In other words, as can be noted from and is readily discernible in prior art, it is the usual procedure to employ a separate and individual rotary joint for each necessary pair of tubes conducting and handling the feed and exhaust of the heat-exchanging liquid or fluid to be utilized. This, as can be readily appreciated, is disadvantageous and not as efficient and effective as is normally to otherwise be desired.

DESCRIPTION AND CHARACTERIZATION OF THE INVENTION

It is amongst the primary purposes and objectives of the present invention to provide a new and improved rotary joint apparatus and mechanical assembly, advantageous and exceptionally useful to employ for any of a great number of applications wherein heat-exchanging liquids and other fluids must be provided to and for rotating units and assemblies, which secures utmost efficiency and benefit in the handling of the heat-exchange media being utilized and which is further characterized in having greatly reduced wear characteristics and, associated therewith, considerably lessened requirements for maintenance and adjustment in and during its operation.

In general accordance with the present invention, an improved rotary joint has all of the necessary fluid conducting tubes which are concentrically arranged and disposed longitudinally within one another rotating with the ring or screw (or other part to be heated and-/or cooled) of the assembly, which tubes terminate within a fixed housing wherein the inlet and outlet ends of the tubes and connections therefor are situate. The housing has an external bearing and sealing surface which meets with an internal barrier and sealing surface. The moving of the tube assembly in the face or bearing surface utilized in accordance with the invention contributes and provides for substantially reduced wear in the utilization of the present variety of rotary joint.

It is frequently intended in accordance with practice of the invention to provide for inlets and outlets of two or more different-temperature zones within the extruder screw or other part being heated and/or cooled. Oftentimes, more or less inert buffer or additional zones are disposed between the thermally active sections for purposes of insulation, leakage control, etc. In such a case, no inlet is provided for the third zone which is actually, as mentioned, merely a buffer arrangement. Any discharge therefrom would be required only in case of leakage to accommodate removal of fluid from such an inert, buffer zone.

More specifically, an improved rotary joint in accordance with the present invention is comprised of an assembly having a plurality of concentrically disposed tubes or pipes so arranged as to rotate together and at the same rate as a bundle with the section or piece (such as an extruder screw or heat-exchange roll) with the tubes extending into the section being heated and-/or cooled and forming and said tubes having annular passageway or heat-exchange communication spaces in between each of the tubes in the bundle so as to provide a pair of concentric inlet and outlet passageways or annular conduits for each heat-exchange liquid, fluid or other vapor being employed; each pair of concentric inlet and outlet passageways for each given heat-exchange fluid, respectively (i) feeding a thermally active zone in the piece or section being heated or cooled through one of the annular passageways which is the inlet (generally, but not necessarily, the outer one) and (ii) exhausting or venting through the outlet annular passageway the used heat-exchange liquid or fluid from the thermally active zone provided therewith; said tubes commencing at their supply and final discharge ends into a housing or chamber arrangement having means therein for supplying and withdrawing heat-exchange fluid from each related pair of annular passageways in said tube bundle; said tube bundle being rotatably positioned and mounted in said housing arrangement which is stationary so that the extremity of the tube bundle in the stationary housing rotates therein with the rotating screw or other piece to and from which the heat-exchange liquid or other fluid is being provided and withdrawn through the annular passageways in said tube bundle. Of course, as is above indicated, baffle or zone separating means are provided in the rotating screw to keep different heat-exchange fluids separated from one another when more than a single heating and/or cooling fluid is being utilized. Likewise, in the stationary housing part which bears the tube bundle array where the initial feed and final outlet ends of the annular passageways are situate, suitable barriers or internal walls (which advantageously and oftentimes comprise and are part of the bearing arrangements for the rotating tube bundle) are provided to keep each heat-exchange fluid separated not only from one another insofar as different fluids that are being employed may be concerned but also separate insofar as any given heat-exchange fluid, per se, is concerned with respect to the fresh inlet supply therein being fed in from the supply means in the housing and in further respect of the used outlet supply of the given fluid which is being exhausted.

Of course, suitable drive means are provided to power and rotate in any desired, convenient and effective manner the heat-exchange fluid conducting tube bundle and the screw or other rotating piece being heated and/or cooled by the rotary joint of the present invention.

The joint apparatus (and associated parts and connected assemblies) may be made as desired and/or necessary of and with any satisfactory material of construction, as will be readily apparent to those skilled in the art.

Use of rotary joint apparatus in accordance with the present invention is particularly advantageous and beneficial in connection with extrusion equipment for various thermoplastic materials—regardless of whether they are metallic, organic or otherwise in compositional nature. This is especially the case where several successive and sequential zones of heating and/or cooling are required (i.e., where multiple feed and usage of different heat-exchange media are employed, especially when used at fairly divergent temperature levels) in the rotating piece or element employed to thermally work upon and affect the material being treated or handled. Various plastic materials, such as saran plastic as a specific but non-limiting illustration, may beneficially be processed in and with apparatus using the rotary joint means of the present invention. The joint arrangement herein described may also be used with great advantage in other types of heat-exchanging rolls and the like, such as those employed for heating and/or cooling various types of web stock including such products as paper, textiles, plastic and other films, and so forth.

PARTICULARIZED EXEMPLIFICATION OF THE INVENTION

The many meritorious objectives and advantages of the present invention are evident in what is above indicated and are even more readily apparent and discernible in and from the following further description and explanation, taken in connection with the associated Drawing, wherein:

FIG. 7 being a cross-section on the line 7—7 in FIG. 5—it being taken into account that FIGS. 6 and 7 are slightly enlarged in the cross-sectional views presented.

In connection with the Drawing, it is to be taken into account that no separate reference numerals are employed for similar parts wherever this is possible in all of the several depicted FIGURE views in the drawing.

Figure 1:
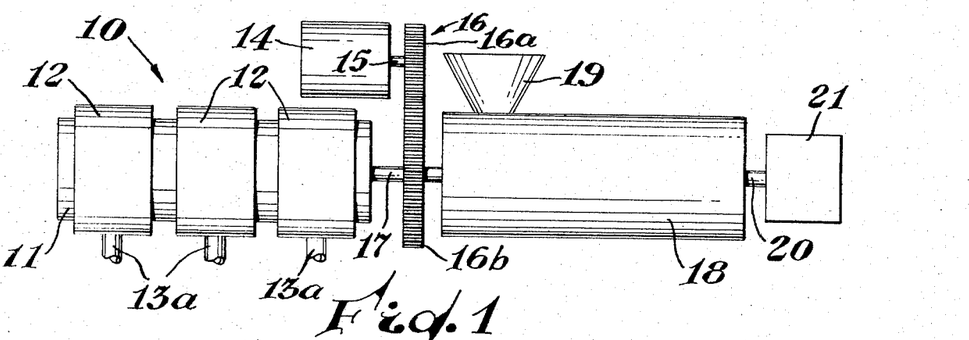
FIG. 1, in a schematic representation, shows the exterior of an apparatus in accordance with the present invention.

With initial consideration of FIG. 1, reference numeral 10 in general indicates a rotary joint assembly combined with a thermoplastic extruder unit in accordance with the present invention. A casing, or barrel, 11 for the moving rotary shaft or joint is indicated. Reference numerals 12 indicate the stationary housings utilized for introduction and removal of the fluid exchange media. Inlet (or outlet) tubes 13a are shown attached in fluid-transmitting connection with the housings 12. Reference numeral 14 illustrates a drive motor for rotating the rotary joint (and the extruder screw unit attached thereto) within the assembly. A shaft 15 is connected from the drive motor to the gear train, indicated generally by reference numeral 16. The gear train 16 is comprised of intermeshed gears 16a and 16b.

A shaft portion 17 which comprises and extend part of the rotary joint is connected to the extruder spindle. The extruder housing or barrel is designated by reference numeral 18. A hopper section feeding the extruder is designated by reference numeral 19. The extruder outlet tube 20 goes into the die body or other extrusion or forming device, if such an installation is involved, designated by reference numeral 21.

Figure 2:
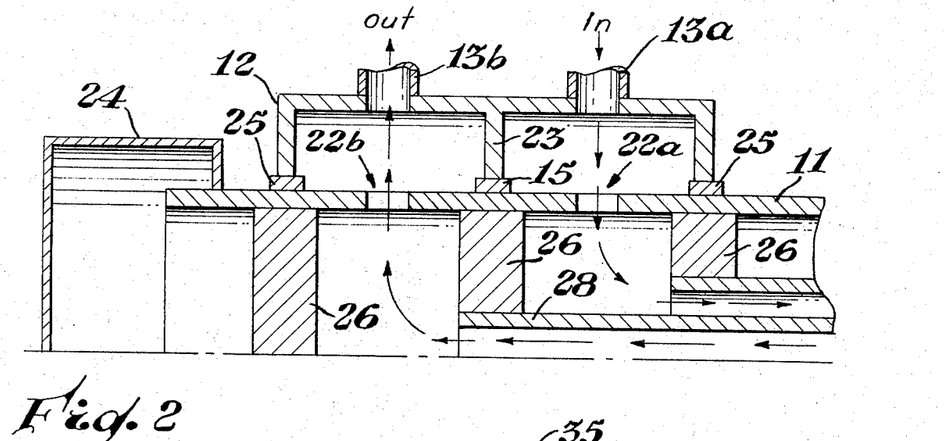
FIG. 2, in cross-section, schematically represents inlet and outlet means for handling heat transfer or heat-exchanging fluids or liquids into and out of the conducting tubes of the apparatus.

In FIG. 2 there is shown the outlet pipe 13b on a housing section 12 for one of the heat-exchange fluids or liquids being vented and exhausted after utilization in the assembly. Inlet pipe 13b is similarly shown. Outlet ports and inlet ports are designated generally by reference numerals 22a and 22b, respectively. These pass the heat-exchange media from the housing section into the area where communication is had with the ends of the annular passageways for conducting the heat-exchange media. The interior separating wall 23 in the housing which depends from the housing 12 separates the inlet and outlet portions of the housing. An end cap 24 seals the termination of the stationary housing part of the assembly. A seal 25 is employed between the fixed housing and the rotating joint tube assembly of the present invention.

Baffles 26 separate the incoming or fresh heat-exchange liquid or fluid coming through the inlet port 13a on its way to the annular conducting passageway therefor in the tube assembly of the rotary joint from the same but used and expended fluid being exhausted through the outlet or vent port 22b (after being returned through the outlet annular conduit) then through the outlet tube 13b. Reference numeral 28 indicates the inner tube wall defining the outlet annular conduit for the fluid outlet; while reference numeral 29 indicates the outer concentric wall for the heat-exchange fluid being fed in through the rotary joint through the annular fluid conducting channel between tube walls 28 and 29. The directional arrows depict the flow passage of the heat-exchange media going through the joint.

In other words, and as is apparent, each set of fluid conducting passages is comprised of conjoined rotating concentric tubes, one within the other.

Of course, if desired or actually necessary in any given instance, there may be utilized at one or more intermediate spaced intervals with the tube bundle assembly of the rotary joint suitable internal spacing and tube separating and positioning elements or supports. These, which may help assure constant clearance dimensions in the conduit passageways formed by the tubes, are perforce of a sufficiently open and/or foraminous design so as to avoid any significant interference with passage of heat-exchange fluid media through the conduit passageways within the tube bundle array. Generally, however, the bearing and connecting supports and attachments at each end of each concentrically arranged and positioned tube in the bundle as are respectively provided in and by the stationary housing and the rotating heat-transfer element for and to secure and have proper and well aligned support and positioning of the tubes in the rotary joint device.

THe innermost tube usually provides the outlet passageway for the heat-exchanging or other fluid after it has served its purpose in the screw or other heat-transferring appliance in which its heating or cooling capability is to be utilized, taking it away from and out of such unit. The next outermost concentric tube or shell generally (although, again, not necessarily) provides the inlet or feed annular passageway in the assembled tube bundle of the joint providing the fresh heat-exchanging media to the heat-transfer unit wherein the temperature influencing effect of the heat-exchange media is to be utilized.

As many of these tubes in double associated or bundled, concentrically disposed relationship may be employed to accommodate, depending on the particular needs and purposes at hand, as many different heat-exchange media as may be needed or wanted. Of course, and as has been indicated, the innermost passageway can be utilized for feeding the heat-exchange media and the outermost for exhaust (or combinations of such variations utilized when several different media are being handled); even though it is usually thermally advantageous and desirable to have the feeding media on the outside of that being exhausted.

Figure 3:
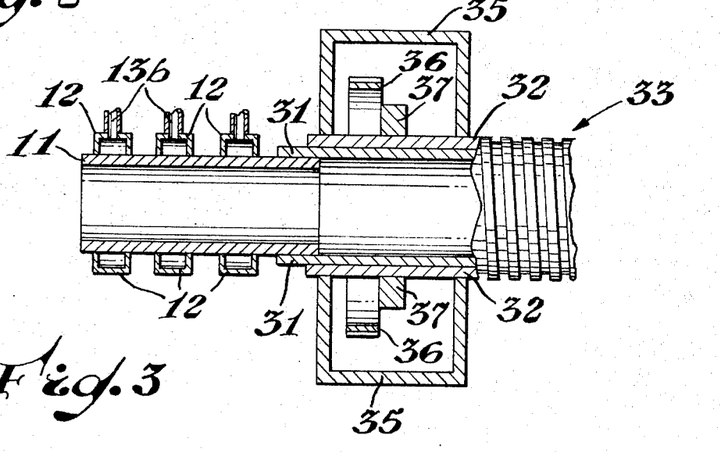
FIG. 3, in a schematic representation partly in cross-section, shows in general illustration the fluid connection means plus the apparatus for driving the screw to which the heat-exchange fluids or liquids are applied in connection with the rotary joint of the invention.

FIG. 3, broken out partly in section, illustrates in relatively greater detail a connecting sleeve for a speed reducer 31. This is attached to the extruder shaft or spindle 32, with the commencement of the flight section within the extruder barrel being indicated generally by the reference numeral 33 and shown in connection therewith. A hollow shaft speed box or reducer housing 35 is illustrated with the gear 37 shown in place for driving the screw. The support flange for holding the whole in position is also illustrated and designated by reference numeral 37. The other parts illustrated in FIG. 3 have the same reference numerals, descriptions and general functions as described in the foregoing.

Figure 4:
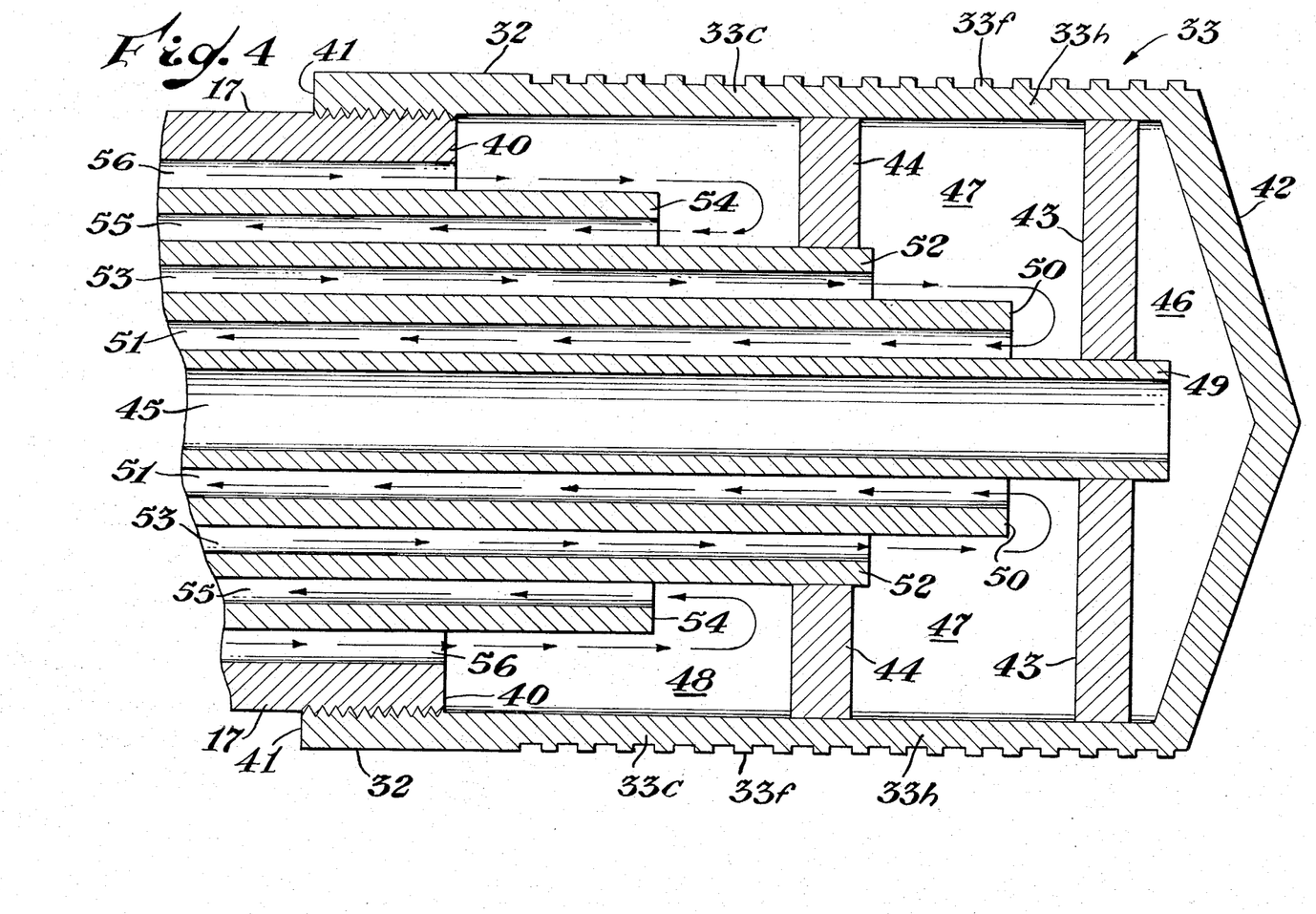
FIG. 4, in cross-section, shows the extruder screw connected with a rotary joint apparatus in accordance with the present invention (with the barrel not being shown)

FIG. 4 shows the extruder screw portion end 32 of the apparatus being fed and heated and/or cooled by a plurality of heat-exchange media using a rotary joint assembly in accordance with the present invention for the purpose. The actual barrel part of the extruder apparatus is for purposes of convenience and due to its obviously necessary presence in an extruder not included or represented in FIG. 4, it being understood that the extruder screw is necessarily operated within an enclosure barrel.

In any event, reference numeral 40 illustrates the threaded end of the shaft barrel 17 in which the tube assembly of the rotary joint is positioned and upon which the interiorly threaded coupling end 41 of the extruder screw section 32 is connected. The extruder nose or end is indicated by reference numeral 42. A first baffle 43 is shown at the end of the screw. A second baffle 44 is in an intermediate position within the screw 32.

Passageway 45 is an innermost tube space for convenient displacement and positioning of wires and the like installations for thermocouples and other temperature recording purposes or for connection of other measuring devices as may be desired to be employed. The space numbered 46 at the end or in the nose section 42 of the screw 32 is merely a dead or empty portion of the screw in which a thermocouple (or thermocouples) or other sorts of sensing devices may be placed.

The numbered space 47 is a heated zone which is fed and supplied with an appropriate and desired heat-exchanging fluid coming into the space after passing through the annular passageway conduit 53. This fluid, proceeding through space 53 as shown by the directional arrows, may be steam, hot water, or any other heat-exchange media desired. The heat-exchanging fluid from passageway 53 occupies space 47 to heat (or cool, as the case may be) section 33$h$ of the screw 32 which is usually the heated part of the extruder. After providing the desired effect on section 33, the fluid is vented back through the annular exit or vent passage 51. Obviously, the heated (or cooled) part of the screw flight section 33, that is part 33$h$, is facilitated in its heat-transfer action by the flights or screws 33$f$ which are disposed on both the rear and forward portions of the screw flight section 33 of the screw 32.

The usually heated zone 47 of the extruder is insulated from the space 46 in the terminal portion by the baffle 43 and, likewise, by baffle 44 from the portion (which is oftentimes a cooling or lower temperature zone) designated by reference numeral 48.

For the cooling or lower temperature portion in the exemplified unit which is positioned in advance of the heating portion of the screw, the cooling fluid or liquid is admitted in the direction shown by the arrows through the exterior circumferential annular inlet passageway 56 to the zone numbered 48 and then vented or exhausted back through the rotary joint for ultimate exit through the annular passageway conduit 55. Ordinarily, although not at all necessarily, water can be utilized as a cooling fluid. Section 33$c$ of the screw 32 conveys the heat-transfer effect of the media in zone 48 to the material being worked upon by the screw.

In other words and with further reference to FIG. 4, it can be readily seen that the heat-exchange fluid or liquid is passed in and out through the annular conduit spaces or passageways 53 and 51 provided by the concentric pipes 50 and 52 into the heating space 47; while the other heat-exchange fluid utilized (either for heating and/or cooling) is passed in and out of the zone or space 48 through the next, larger-sized set of concentrically disposed pipes or tubes 54 and 40 (taking into account that the latter is actually the outer wall of the rotary joint) forming the respective inlet and outlet annular passageway conduits 56 and 55.

Thus in the usual case as is explained in the foregoing, each set of concentrically spaced and positioned tubes or pipes in the bundle assemble allows the fluid going in for heating or cooling through the more central part and exhausts the same through the more exterior part for the same particular heat-exchange media being employed. In this way, sections of the screw or other part being heated and/or cooled to various desired degrees of temperature are provided with the necessary fluid media for the purpose which, within that section, are separated one from the other by appropriate baffles or equivalent partitions. And, all at the same time, all necessary heat-exchange media is supplied and directed to the desired heating and/or cooling zone or zones by means of a unitarily rotating set of pipes or joints having a single action and requiring, in effect, only a single seal and drive means in association therewith.

Figure 5:
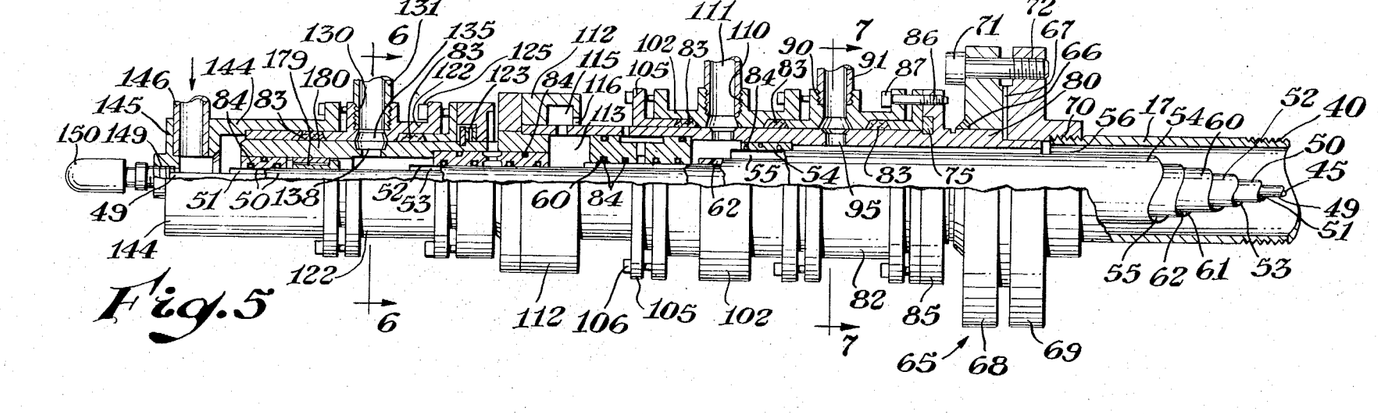
FIGS. 5, 6 and 7 show on the feed end of the apparatus the inlet and outlet arrangements in cross-section for handling the heat-exchanging fluids; with FIG. 5 in part section partly broken away and FIG. 6 being a cross-section taken along the line 6—6 in FIG. 5 (i.e., facing left to right)
Figure 6:
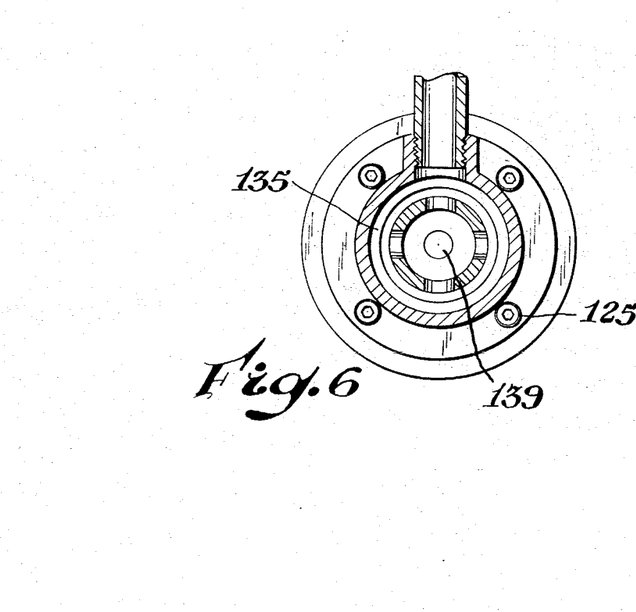
Figure 7:
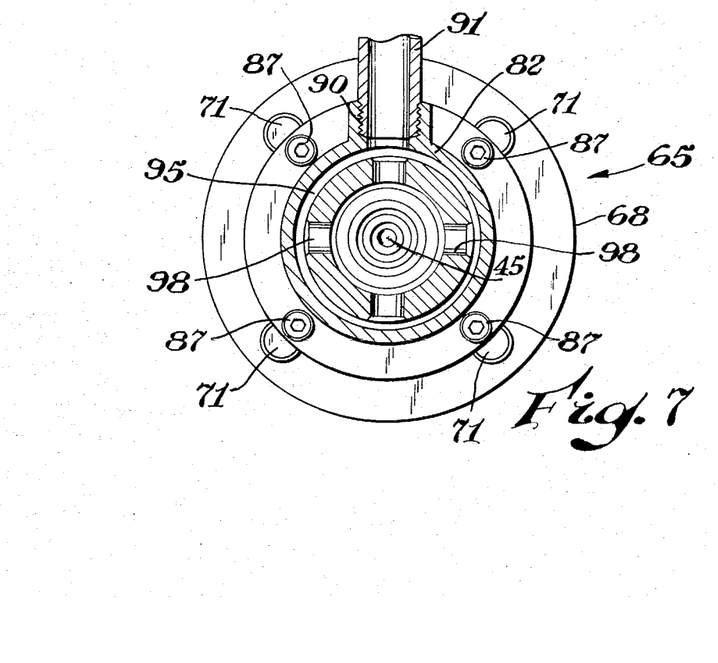

FIGS. 5, 6 and 7 still further illustrate all of the foregoing in more particular detail.

FIG. 7. as indicated, is a partly sectioned and partly broken away view, with FIG. 6 and 7 being respective and slightly enlarged cross-sections thereof.

As shown in FIG. 5, reference numeral 60 indicates a neutral zone vent pipe whereas 61 shows an annular vent space associated therewith. A "Teflon" or equivalent insulating layer 61 is indicated as being provided as covering about the tube 60. Of course, intermediate insulating portions are particularly helpful when heat-exchange media of widely differing temperature ranges are being used. A rotating coupling is generally indicated by the reference numeral 65. Reference numeral 66 designates a sealing gasket, as does reference numeral 67. Flange sections 68 and 69 are shown for holding and supporting the rotary joint securely in place in the assembly. Reference numeral 70 indicates the interior threaded end of a coupling; with bolt 71 utilized therewith going through the threaded hole 72 in the section 69. A seal 75 is employed in connection with the flange ring support 85. This is, in turn, connected to the housing where rotating wall member 80 forms the outer wall of the annular space 56; while stationary housing 82 is illustrated which is the equivalent of part number 12 illustrated in FIGS. 1 through 3. Packing rings 83 wherever they are necessarily or advantageously employed are illustrated. O-rings 84 are also shown where it is necessary or desirable that they be utilized. Part number 85 is a flange ring support which is connected to the housing portion of the assembly. Reference numeral 86 indicates the threaded hole in flange 85 for reception of bolt 87.

The threaded entry port 90 is made in the housing 82 for acceptance of the inlet pipe 91. Annular space 95 is shown between the housing 82 and the rotating wall member 80. Inlet ports 98 are illustrated as going through the wall member 80 for the purpose of introducing the heat-exchange fluid into the apparatus.

The housing section 102 for the water or other cooling (or heating) fluid or liquid media outlet is connected to the part 92 by a bolt (not shown). Part number 105 is the flange part of the housing with the bolt numbered 106 shown in connection therewith. Reference numeral 110 indicates the threaded outlet port in part 102; and the outlet pipe 111 is illustrated in the threaded outlet 110.

Reference numeral 112 indicates the housing section for a neutral vent zone and an annular vent outlet area 113 is also illustrated. Vent ports 114 are positioned through the rotating wall member 80; and an annular baffle zone 115 is located in the housing which, coincidentally, also helps to avoid undesired outbursts of liquid or fluid heat-exchange media. A general vent outlet to the atmosphere 116 is also positioned in the illustrated assembly.

Housing 122 in the assembly shown in FIG. 5 is provided for the steam or hot heat-exchange fluid part of the particular assembly depicted. Thrust bearing 123 is provided in connection with this; with the bolt 125 holding it all in place. Bolts 126 in the housing 112 (not shown in FIG. 5) are employed to keep the entire unit together. A clip ring mounting 179 is located between the part 180 and the pipe 50 with the part 180 being a coupled extension of the rotating wall 80.

The threaded inlet port 130 in the housing 122 is employed for accommodation of the pipe 131.

The annular space 135 between the housing 122 and the rotating wall member 180 is provided for passage of fluid. Outlet ports or openings 138 are provided through the wall member 180.

Reference numeral 139 in FIG. 6 designates (for purposes of convenience) the through tubes 52 and 50 which have been depicted and described in connection with other views in the Drawing.

A cap housing 144 terminates the particular assembly shown in FIG. 5. This housing has a threaded outlet port 145 with a connecting pipe 146 for the transmission of fluids. A threaded hole 149 is located at the end of the housing 144 for provision of a thermocouple 150 which is indicated only generally in FIG. 5.

Figure 8:
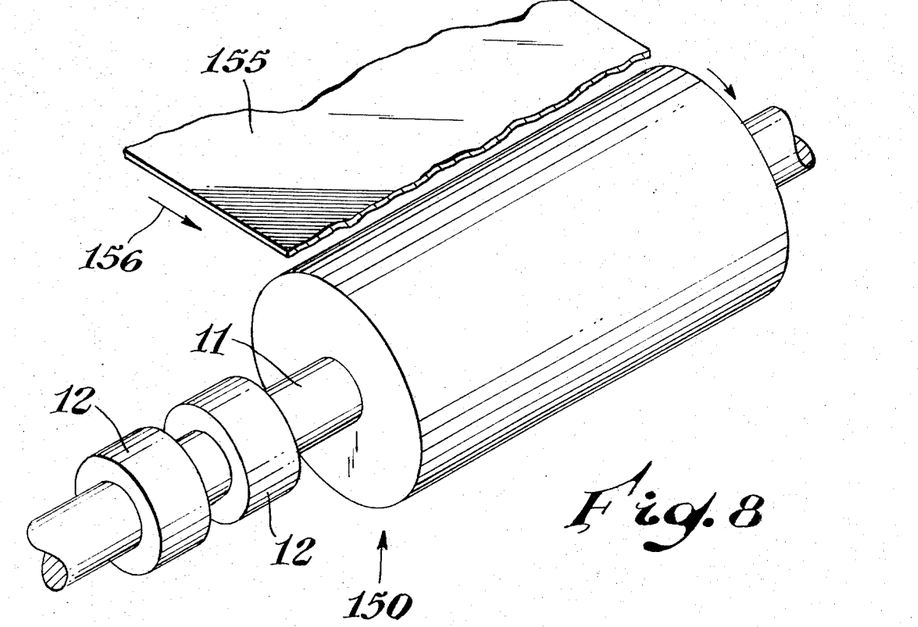
FIGS. 8 and 9, in schematic perspective, represent the thermally affected ends of heating and/or cooling roll units for processing materials thereover using heat-exchange fluids obtained and delivered in accordance with rotary joint apparatus pursuant to the present invention.
Figure 9:
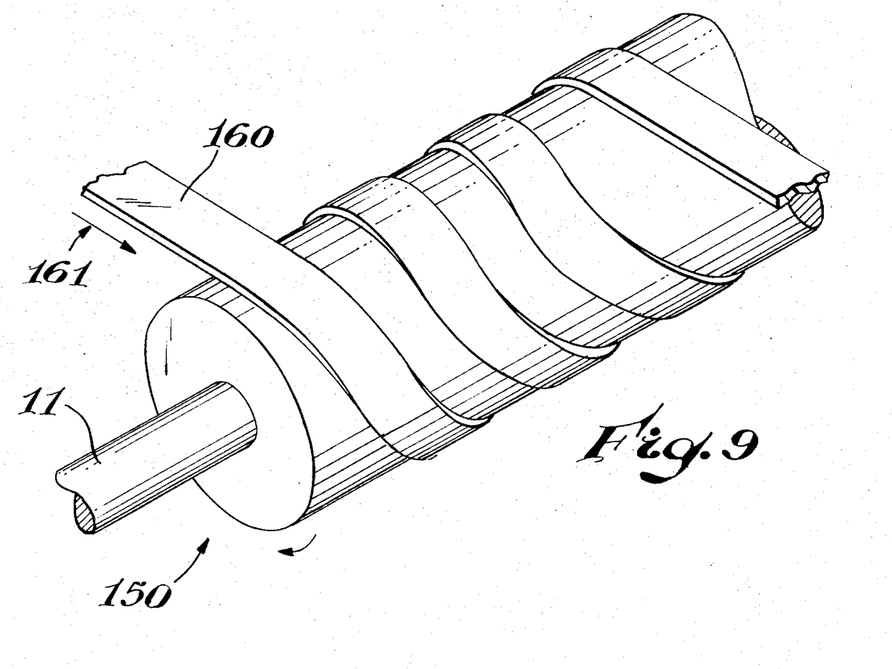

FIGS. 8 and 9 show other practical adaptations of rotary joint assemblies in accordance with practice of the present invention.

For example, in FIG. 8 there is shown a sectionally heated processing roll, indicated generally by reference numeral 150. Over roll 150, which may if so wished have any desired number of sequentially heated and/or cooled surface sections in any particular heat-transferring sequence wanted, a single web of material 155 under thermal treatment is shown traveling in the direction of the arrow indicated by reference numeral 156 heating and/or cooling during its passage over and about the roll 150. Of course, such a roll may consist of only a single overall heating or cooling zone so as to provide the roll with a constant temperature on its entire surface.

Alternatively, as shown in FIG. 9, a single web of material designated by reference numeral 160 may be spirally wound about the roll in the direction of the arrow indicated by reference numeral 161 to go through several areas of heating and/or cooling in any desired sequence according to the manner of heat-transfer effected and utilized by the rotary joint employed in accordance with the practice of the invention.

Many changes and modifications can readily be made and adapted in embodiments in accordance with the present invention without substantially departing from its apparent and intended spirit and scope, all in pursuance and accordance with same as is set forth and defined in the hereto appended claims.

What is claimed is:

1. A unitary rotary joint device for providing heat-exchange fluid media into and out of a rotating heat-transferring element with which said element is rotated in and at a rate of rotation the same as that of said rotary joint, said rotary joint and said rotating element being in integrally joined connection, which rotary joint device comprises:

at least a single pair of concentrically aligned and positioned tubes that are respectively larger in diametric size forming at least a single annular passageway therebetween for passage of heat-exchange fluid media in opposite directions within said tubes;

one of the passageways in said tube pair providing an inlet conduit passageway for forwarding heat-exchange fluid media into a heat transfer zone of said rotating heat-transferring element to which said rotary joint device is connected;

the other of the passageways in said tube pair providing an outlet conduit passageway for withdrawing the heat-exchange fluid media from the heat-transfer zone of said rotating heat-transferring element after said media has been utilized in said heat transfer zone of the rotating element; and stationary housing and heat-exchange handling means into which said rotary joint extends and bears in its rotational movement which means are adapted to provide fresh heat-exchange fluid media into the inlet conduit of said rotary joint device and to withdraw and vent spent heat-exchange fluid media from the outlet conduit of said rotary joint device.

2. The device of claim 1, wherein each pair of conduit-providing tubes are positioned about a central core or pipe in the said rotary joint device so that each of the inlet and outlet conduit passageways for handling of said heat-exchange fluid media are annular in cross-section.

3. A device according to the device of claim 2, wherein:

there are provided a plurality of pairs of inlet and outlet passageway providing tubes to handle a corresponding plurality of diverse heat-exchange fluid media; with each related pair of heat-exchange fluid media tubes feeding said fresh media into and withdrawing said used media from a separate and corresponding heat-transfer zone of said rotating heat-transferring element to which said rotary joint device is connected and with which said rotary joint device is rotated.

4. A device according to the device of claim 3, wherein:

said separate heat-transfer zones in said rotating heat-transferring element are isolated from one another by partitioning baffle walls; and the heat-exchange media feed and withdrawing means in said stationary housing are isolated one from another by wall partitions separating each heat-exchange fluid media section for each such different media being fed into and vented from for each associated pair of inlet and outlet passageways provided by the concentrically positioned and arranged tubes in said rotary joint device.

5. A device according to the device of claim 3, wherein at at least one of the heat-transfer zones in said rotating heat-transferring element is a heating zone and at least one of the remaining zones is a cooling zone.

6. A device in accordance with the device of claim 1 and including, in association therewith and in addition thereto, means for rotatably driving said coupled rotary joint device and the therewith connected rotating heat-transferring element.

7. A device in accordance with the device of claim 1, wherein said rotating heat-transferring element is a screw section of an extruder apparatus for extruding thermoplastic material.

8. A device in accordance with the device of claim 2, wherein said rotating heat-transferring element is a screw section of an extruder apparatus for extruding thermoplastic material.

9. A device in accordance with the device of claim 1, wherein said rotating heat-transferring element is a heat-exchanging roll for thermally treating web-like materials being passed thereover and thereabout.

10. A device in accordance with the device of claim 2, wherein said rotating heat-transferring element is a heat-exchanging roll for thermally treating web-like materials being passed thereover and thereabout.

* * * * *

UNITED STATES PATENT OFFICE
CERTIFICATE OF CORRECTION

Patent No. 3,805,888   Dated April 23, 1974

Inventor(s) Edward V. Dettmer

It is certified that error appears in the above-identified patent and that said Letters Patent are hereby corrected as shown below:

Column 2, line 63, "per se" should read -- *per se* --. Column 5, line 23, "THe" should read -- The --, line 24, after "heat-exchanging" insert -- liquid --. Column 6, the following identified reference numbers should be underlined to meaningfully and accurately correspond with their representation in the drawing: "46" at line 17; "47" at line 22; "47" at line 39; "46" at line 40; "48" at line 49; "48" at line 54; "47" at line 60; and "48" at line 63.

Signed and sealed this 24th day of September 1974.

(SEAL)
Attest:

McCOY M. GIBSON JR.
Attesting Officer

C. MARSHALL DANN
Commissioner of Patents